United States Patent [19]

Hackett et al.

[11] Patent Number: 5,102,069
[45] Date of Patent: Apr. 7, 1992

[54] AIRCRAFT WING PYLON EXTENSIONS FOR MINIMIZED AERODYNAMIC PENALTIES

[75] Inventors: Kevin C. Hackett; Martin R. Schofield, both of Herts, England

[73] Assignee: British Aerospace Public Limited Company, London, England

[21] Appl. No.: 626,049

[22] Filed: Dec. 12, 1990

[30] Foreign Application Priority Data

Dec. 12, 1989 [GB] United Kingdom ............... 8928038

[51] Int. Cl.⁵ ............................................. B64D 27/26
[52] U.S. Cl. ....................................... 244/54; 244/130
[58] Field of Search ........................... 244/54, 55, 130

[56] References Cited

U.S. PATENT DOCUMENTS

| | | | |
|---|---|---|---|
| 4,067,518 | 1/1978 | Paterson et al. | 244/130 |
| 4,314,681 | 2/1982 | Kutney | 244/54 |
| 4,637,573 | 1/1987 | Perin et al. | 244/54 |
| 4,712,750 | 12/1987 | Ridgwell | 244/117 A |
| 4,867,394 | 9/1989 | Patterson, Jr. | 244/55 |

FOREIGN PATENT DOCUMENTS

| | | | |
|---|---|---|---|
| 1545957 | 10/1968 | France | |
| 2200878 | 8/1988 | United Kingdom | 244/55 |

Primary Examiner—Joseph F. Peters, Jr.
Assistant Examiner—Carla Mattix
Attorney, Agent, or Firm—Cushman, Darby & Cushman

[57] ABSTRACT

A wing mounted pylon for an aircraft in which the pylon can be maintained in a desired maximum thickness consistent with structural and accessory and equipment space requirement but with substantially zero aerodynamic penalties. The maximum parallel thickness extends over at least a portion of the pylon length and is then maintained beyond the wing local trailing edge by means of a trailing edge extension fairing.

3 Claims, 8 Drawing Sheets

AIRCRAFT WING PYLON EXTENSIONS FOR MINIMIZED AERODYNAMIC PENALTIES

BACKGROUND OF THE INVENTION

1. Field of the Invention

This invention relates to wing pylon arrangements for aircraft. More particularly it relates to extension fairings for pylons to minimise aerodynamic penalties on the wing.

2. Description of the Related Art

Both civil and military aircraft require underwing mounted pylons to carry engines, weapons and fuel tanks. The purpose of the pylon is not only to support underwing items but also carry, internally, services and accessories. The presence of underwing pylons can produce an aerodynamic penalty in the form of a loss of local wing lift. This aerodynamic penalty can be reduced by careful design of the pylon cross-section. However, this tends to result in a thin pylon with a complicated shape and, consequently, a reduction in available internal volume for the services and accessories.

One of the ideal pylon shapes for ease of manufacture, low weight and low cost is a flat-sided pylon structural box of constant thickness with a simple front and rear fairing. Its aerodynamic qualities, however, are poor. There is therefore a conflict of reqirements between what is good for aerodynamic performance and what is beneficial for manufacture structure and costs.

It is the object of the present invention to provide an improved pylon configuration of simple construction with very little or no aerodynamic penalty relative to an aerodynamically optimum pylon.

One known prior art pylon arrangement is disclosed in U.S. Pat. No. 4,867,394 (Patterson) in which the pylon is shaped in such a way as to reduce the drag and loss of wing lift within the fuselage-wing-pylon nacelle channel of an aircraft without creating additional drag associated with other areas of the pylon. In this arrangement, the chord length of the pylon is greater than the local chord length of the wing to which it is attached. However, the cross-sectional area of the pylon progressively increases longitudinally from its leading edge to the local trailing edge of the wing and thereafter decreases longitudinally from the local trailing edge of the wing to the trailing edge of the pylon.

SUMMARY OF THE INVENTION

According to the present invention there is provided a wing mounted pylon arrangement for aircraft including a wing having a leading edge, a trailing edge, an upper aerodynamic surface, a lower aerodynamic surface and a pylon mounted on and downwardly depending from the lower aerodynamic surface;

said pylon having a forward portion extending forwardly of the wing leading edge and a rear portion extending rearwardly to substantially the local wing trailing edge and an intermediate substantially parallel portion of maximum thickness over at least a portion of its length;

said parallel portion blending forwardly in a smoothly curving leading edge and rearwardly in a tapering afterbody portion to form a trailing edge;

characterised in that said pylon further includes a pylon trailing edge extension fairing adjacent the lower aerodynamic surface of the wing, being a rearward parallel extension of the pylon maximum thickness and extending at that thickness rearward of the wing trailing edge then terminating in a tapering afterbody trailing edge portion;

the arrangement being such that the pylon can be maintained at a desired maximum thickness with substantially no local loss of local aerodynamics lift and a drag penalty substantially reduced to zero.

One embodiment of the invention will now be described, by way of example only, and with reference to the accompanying Figures in which;

DETAILED DESCRIPTION OF THE PRESENTLY PREFERRED EXEMPLARY EMBODIMENTS

Figures 1, 2:
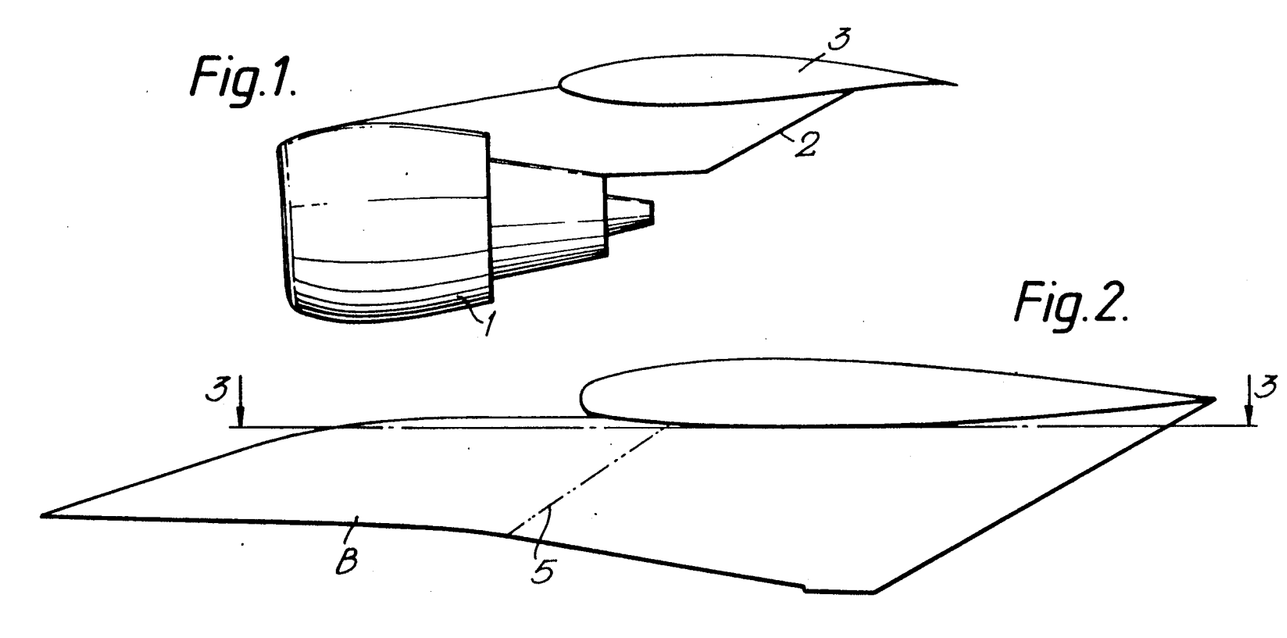
FIG. 1 illustrates diagrammatically a side elevation on a typical wing mounted pylon installation for mounting a propulsion engine.
FIG. 2 illustrates diagrammatically a side elevation on a typical wing mounted pylon (Pylon B).
Figure 3:
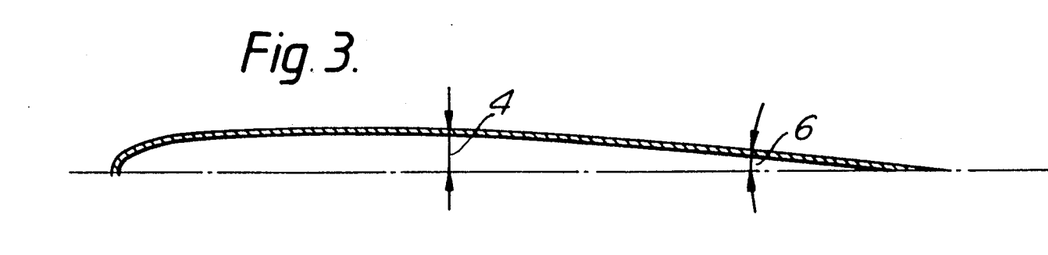
FIG. 3 is a half longitudinal cross-section through the pylon taken along a line '3—3' in FIG. 2.

Referring to the drawings, FIG. 1 shows a typical engine installation for aircraft whereby the engine 1 is mounted upon a pylon structure 2 depending from a wing 3. Underwing mounted pylons may similarly be used for carrying weapons and fuel tanks for example.

Because the presence of underwing pylons can produce an aerodynamic penalty in the form of a loss of local wing lift careful attention must be paid to the design to reduce this aerodynamic penalty. As previously stated this tends to result in a thin pylon but is insufficient in terms of internal space for the containment of services and accessories. Reference is now made to FIGS. 2-9 inclusive.

FIGS. 2–5 inclusive show two typical pylon shapes for underwing mounted engines. That of FIGS. 2 and 3 (Pylon B) is designed for minimum aerodynamic penalty. The features of this design are low maximum thickness 4, illustrated as half plan thickness, start of the afterbody blend 5 well forward towards the local Wing Leading Edge and low pylon trailing edge angle 6. However, this low thickness means that the pylon is unable to satisfy the structural design requirements in terms of providing stiffness as well as space for internal accessories.

Figure 4:
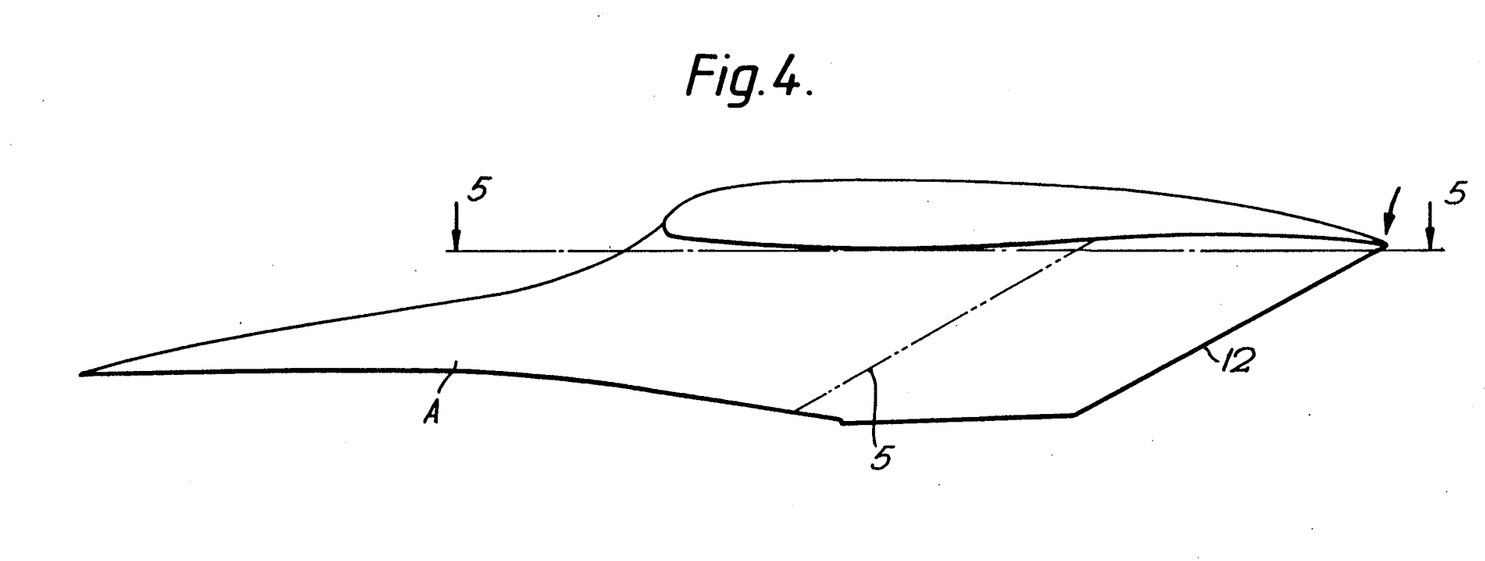
FIG. 4 is a side elevation on a further typical wing mounted pylon (Pylon A).
Figure 5:
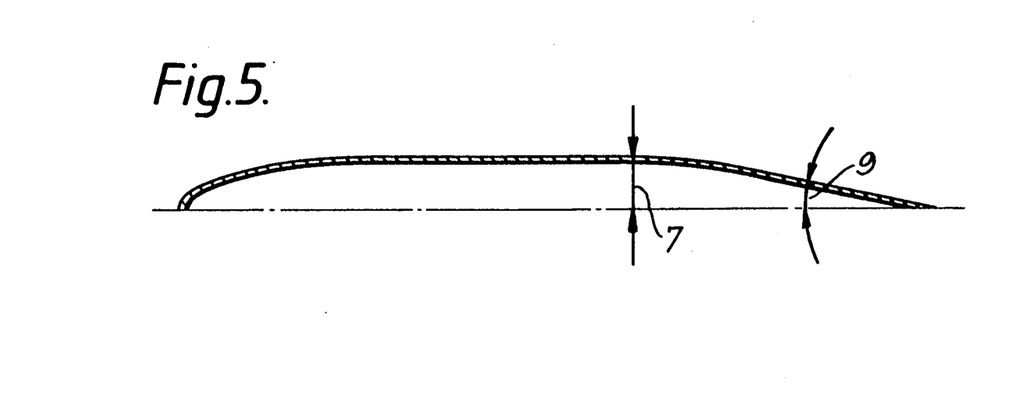
FIG. 5 is a half longitudinal cross-section through the pylon taken along line '5—5' in FIG. 4.
Figure 6:
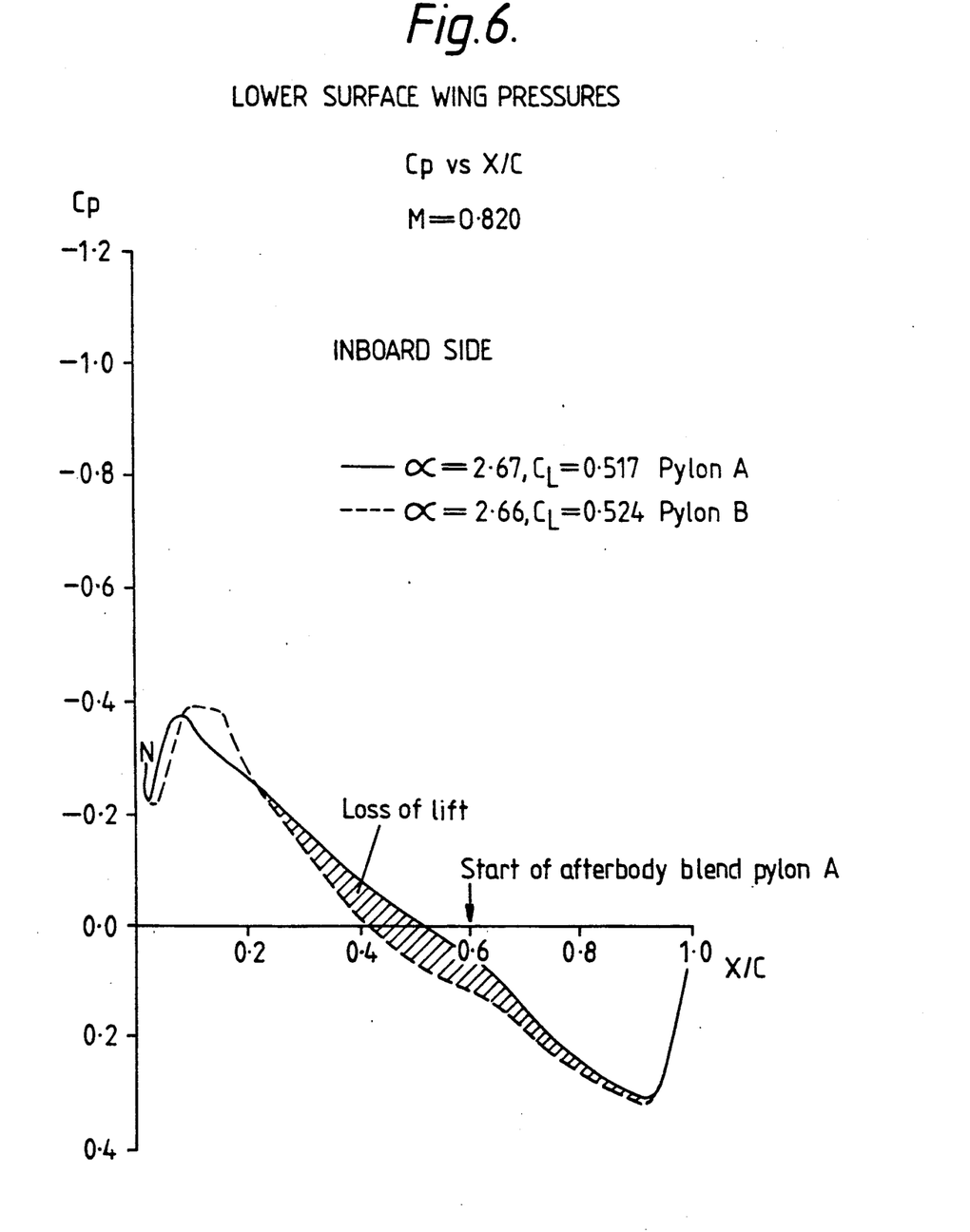
FIGS. 6 and 7 graphically illustrate the wing lower surface pressure inboard and outboard of the pylon and the adverse effect of the pylon of FIG. 4 relative to that of FIG. 2.
Figure 7:
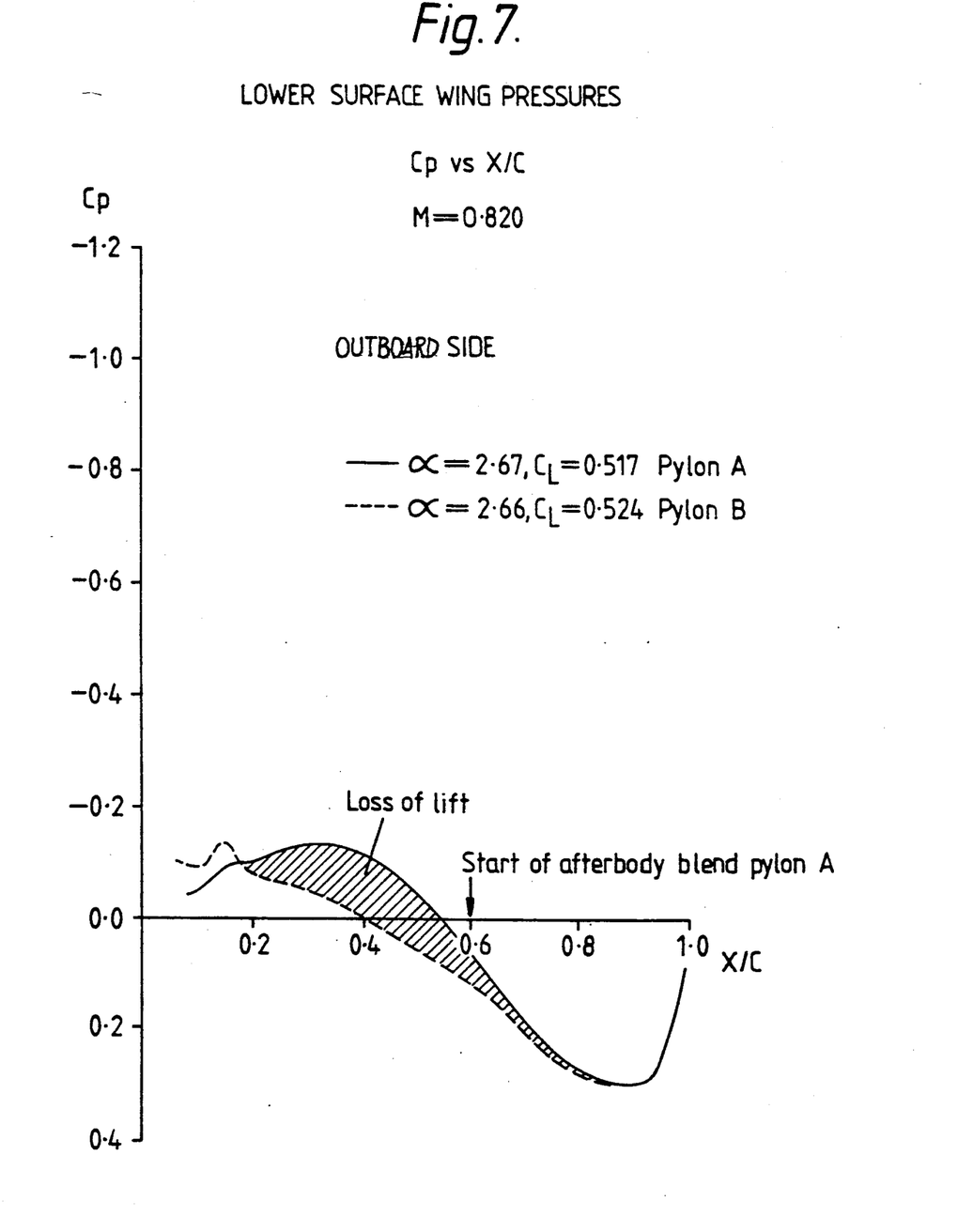

The pylon arrangement of FIGS. 4 and 5 (Pylon A) is designed to meet the structural requirements but results in an increase in maximum thickness 7, illustrated in FIG. 5 as half-plan thickness, a further aft start of the afterbody blend 5 and high pylon trailing edge angle 9. These features, however, tend to produce an aerodynamic penalty in the form of local loss of wing lift.

Figure 8:
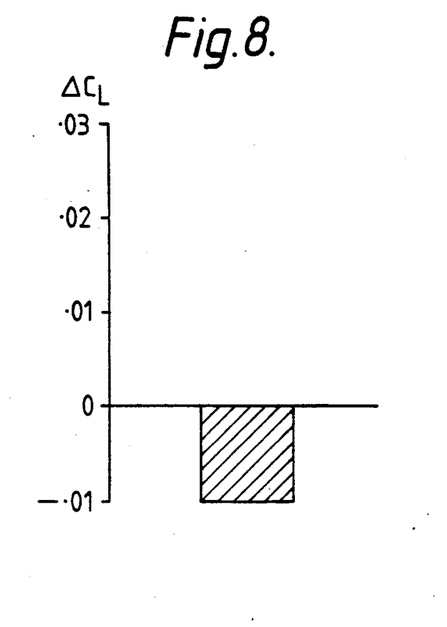
FIGS. 8 and 9 respectively show the lift loss and drag penalty associated with the pylon of FIG. 4 at a typical high speed cruise condition for a long range civil aircraft.
Figure 9:
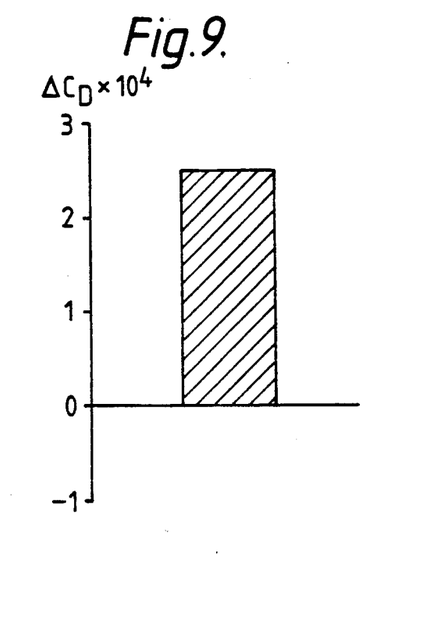

The wing lift loss is caused by the increase in velocity due to the increase in pylon maximum thickness and the aft position of the afterbody blend 5 adversely affecting the wing lower surface pressures. By reference to FIG. 6 and 7 the graphical representation of the wing lower surface pressures at inboard and outboard sides of the pylon and clearly shows the adverese performance of pylon A relative to pylon B. FIGS. 8 and 9 respectively illustrate the lift loss and drag penalty associated with pylon A at a typically high speed cruise condition for a long range civil aircraft. For this example the penalty is of the order of 1.25% loss of high speed buffet $C_L$ and 1% cruise drag penalty.

Figure 10:
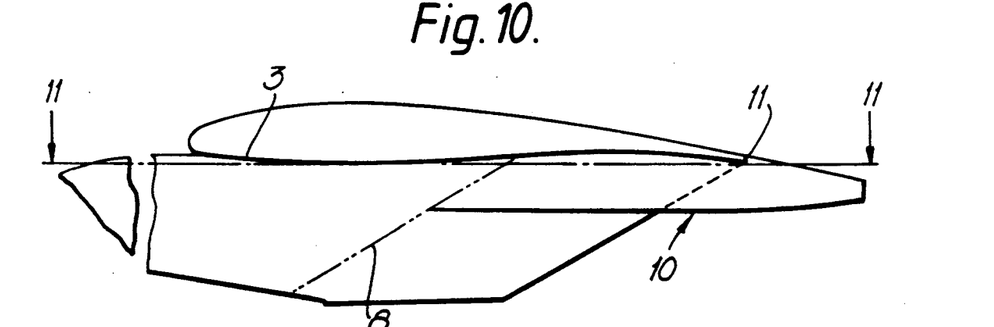
FIG. 10 illustrates a side elevation on a typical wing mounted pylon installation incorporating the pylon extension fairing of the present invention.
Figure 11:
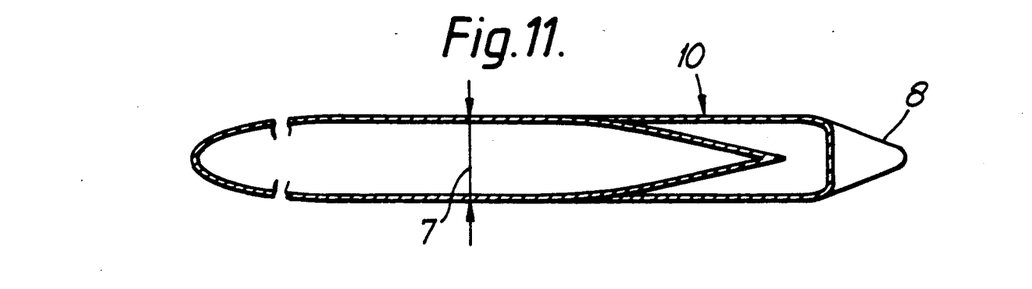
FIG. 11 illustrates a typical longitudinal cross-section through the pylon arrangement taken along a line '11—11' in FIG. 10.

In accordance with the present invention and with reference to FIGS. 10 and 11, the increase in flow velocities due to the pylon thickness 7 and aft position of the afterbody blend 5 can be reduced by adding a pylon trailing edge extension fairing 10. The amount of velocity increase is controlled by maintaining as much as possible the maximum width 7 of the pylon to beyond the trailing edge 11 of the wing 3. The afterbody of the fairing is thereafter closed in a tapering afterbody portion 8 to form a trailing edge.

Figure 12:
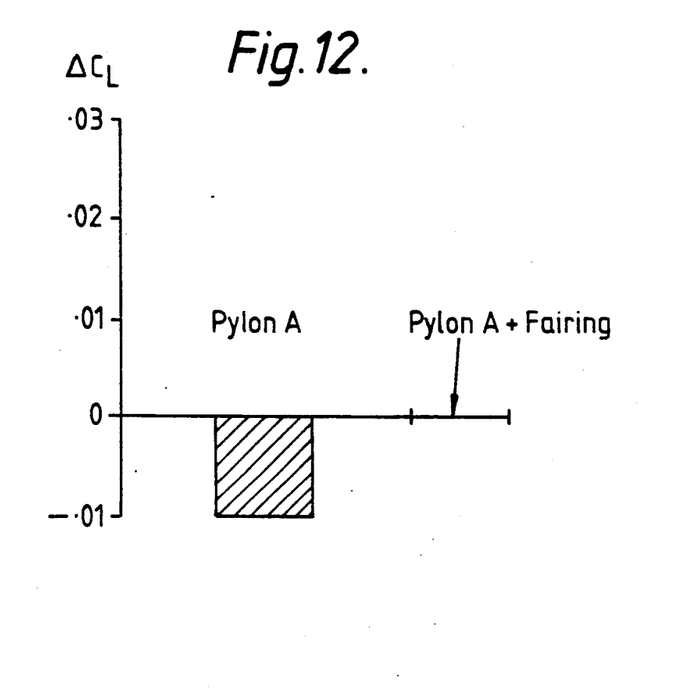
FIGS. 12 and 13 respectively illustrate graphically the beneficial effect on lift and drag as a consequence of the present invention.
Figure 13:
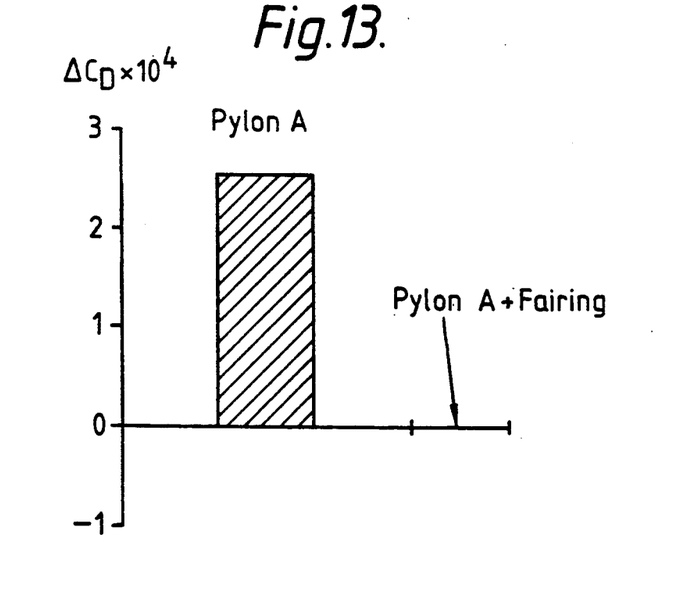
Figure 14:
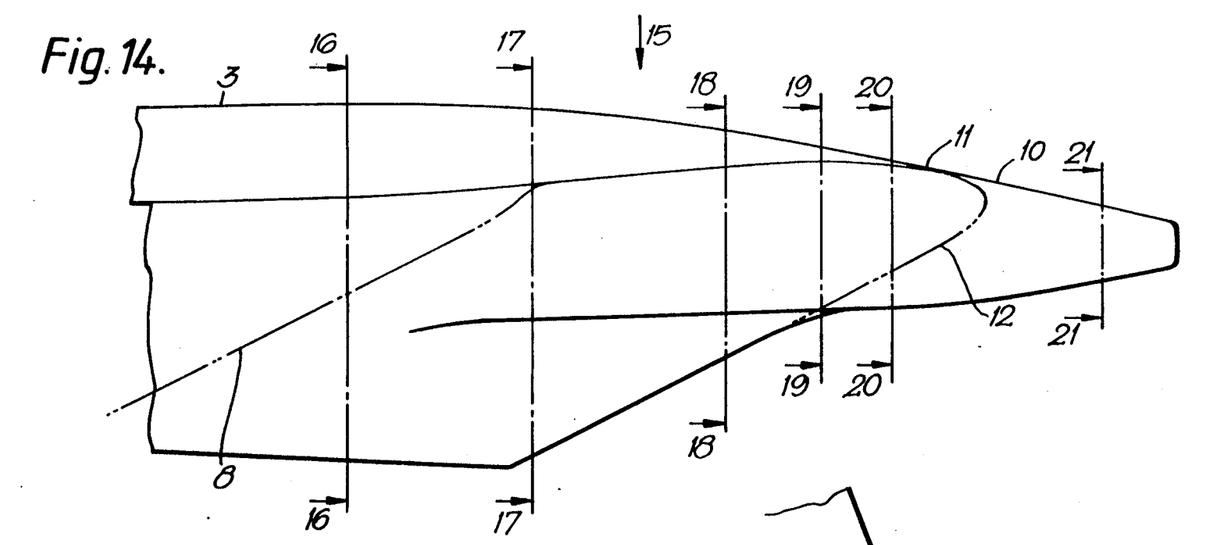
FIG. 14 is a side elevation on a rearward portion of a typical pylon incorporating the pylon extension fairing of the present inveintion.

The effect on lift and drag as a consequence of adding the fairing 10 to pylon A is shown in FIGS. 12 and 13, both of which show for ease of comparison the lift and drag condition prior to and as a consequence of the present invention. For this example the additional lift loss and drag penalty is reduced substantially to zero and has the same aerodynamic standard as pylon B. Therefore the benefit of the present invention is to provide a pylon designed to meet the structural and production requirements without incurring an additional aerodynamic penalty.

Figure 15:
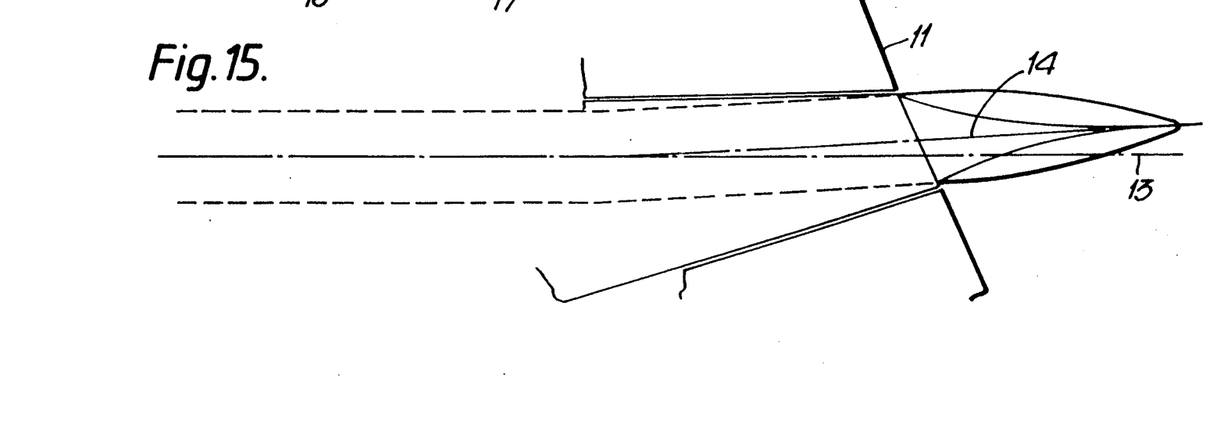
FIG. 15 is a plan view on the aircraft wing with installed pylon viewed in direction of Arrow 15 in FIG. 14.
Figure 16:
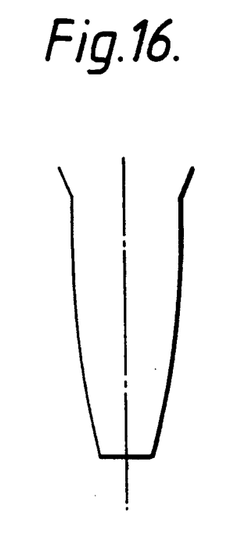
FIGS. 16-21 inclusive, illustrate typical cross-section at selected datum positions along the pylon arrangement of the present invention as indicated with appropriate section lines in FIG. 14.
Figure 17:
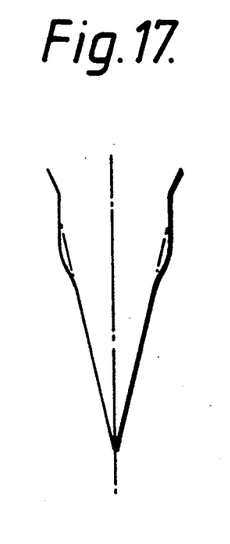
Figure 18:
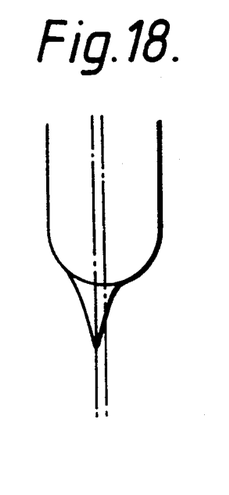
Figure 19:
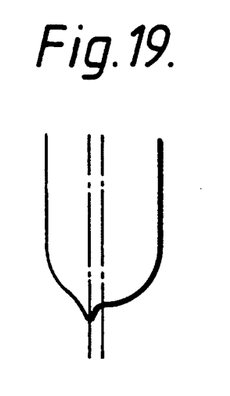
Figure 20:
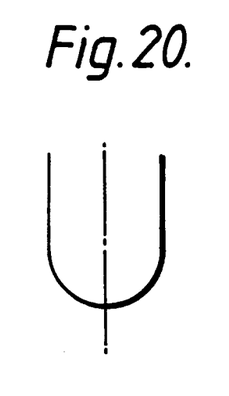
Figure 21:
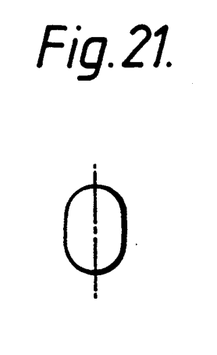

FIGS. 14–21 inclusive illustrate in more detail the trailing edge extension fairing 10, FIGS. 16–21 inclusive in particular illustrating the cross-sectional development of the fairing relative to the basic pylon. Although not illustrated here, the fairing 10 may be constructed as an integral part of the pylon or as a bolt-on addition. In the latter configuration the theoretical rearwards extent of the basic pylon is indicated at 12 in chain-dotted line. As shown in FIG. 15 whilst the pylon may lie symmetrically about a fore and aft pylon centre line 13, in the present embodiment the extension 10 is configured in plan to lie along and about a datum centre line 14, which is expedient to accommodate the trailing edge flaps, ailerons, trailing edge structure etc.

We claim:

1. A wing mounted pylon arrangement for aircraft including a wing having a leading edge, a trailing edge, an upper aerodynamic surface, a lower aerodynamic surface and a pylon mounted on and downwardly depending from the lower aerodynamic surface;

said pylon having a forward portion extending forwardly of the wing leading edge and a rear portion extending rearwardly to substantially the local wing trailing edge and an intermediate substantially parallel portion of maximum thickness over at least a portion of its length;

said parallel portion blending forwardly in a smoothly curved leading edge and rearwardly in a tapering afterbody portion to form a trailing edge;

said trailing edge of said tapering afterbody portion extending in a downwardly and forwardly direction, the rearward blending of the parallel portion and the tapering afterbody portion following a line substantially parallel to the trailing edge of said tapering afterbody portion;

said pylon further including a pylon trailing edge extension fairing adjacent the lower aerodynamic surface of the wing, being a rearward parallel extension of the pylon maximum thickness and extending at that thickness rearward of the wing trailing edge then terminating in a tapering trailing edge portion;

the arrangement being such that the pylon can be maintained at a desired maximum thickness with substantially no local loss of aerodynamic lift and a drag penalty substantially reduced to zero.

2. A pylon arrangement according to claim 1 in which the pylon includes an integrally formed trailing edge extension fairing.

3. A pylon arrangement according to claim 1, in which said trailing edge of said tapering afterbody portion is generated from a point substantially co-incident with the local trailing edge of the wing.

* * * * *